US007958036B1

(12) United States Patent
Caron et al.

(10) Patent No.: US 7,958,036 B1
(45) Date of Patent: Jun. 7, 2011

(54) SYSTEM AND METHOD FOR CALCULATING A VOLATILITY CARRY METRIC

(75) Inventors: James A. Caron, New Canaan, CT (US); William J. McGraw, Hoboken, NJ (US); Jason D. Stipanov, Montclair, NJ (US)

(73) Assignee: Morgan Stanley, New York, NY (US)

( * ) Notice: Subject to any disclaimer, the term of this patent is extended or adjusted under 35 U.S.C. 154(b) by 315 days.

(21) Appl. No.: 12/420,988

(22) Filed: Apr. 9, 2009

(51) Int. Cl.
*G06Q 40/00* (2006.01)
(52) U.S. Cl. ........................................................ 705/35
(58) Field of Classification Search .................. None
See application file for complete search history.

(56) References Cited

U.S. PATENT DOCUMENTS

| | | | | |
|---|---|---|---|---|
| 6,546,375 B1* | 4/2003 | Pang et al. | ...................... | 705/37 |
| 6,772,136 B2* | 8/2004 | Kant et al. | ...................... | 706/50 |
| 7,149,715 B2* | 12/2006 | Browne et al. | ............. | 705/36 R |
| 7,287,006 B1* | 10/2007 | Kratka | ........................ | 705/36 R |
| 7,409,367 B2* | 8/2008 | McGill et al. | .................... | 705/37 |
| 7,440,916 B2* | 10/2008 | Browne et al. | ............. | 705/36 R |
| 7,599,870 B2* | 10/2009 | Merkoulovitch et al. | ... | 705/36 R |
| 7,752,099 B2* | 7/2010 | Madhavan et al. | ............. | 705/35 |
| 7,752,123 B2* | 7/2010 | Brookfield et al. | ............. | 705/37 |
| 7,761,360 B1* | 7/2010 | Browne et al. | ............. | 705/36 R |
| 7,788,166 B2* | 8/2010 | Vischer et al. | .................... | 705/37 |
| 7,797,215 B1* | 9/2010 | Zerenner et al. | ............. | 705/36 R |
| 7,917,419 B2* | 3/2011 | Browne et al. | ............. | 705/36 R |
| 2002/0010667 A1* | 1/2002 | Kant et al. | ...................... | 705/35 |
| 2003/0014355 A1* | 1/2003 | Browne et al. | ................. | 705/38 |
| 2003/0018456 A1* | 1/2003 | Browne et al. | .................... | 703/2 |
| 2003/0074167 A1* | 4/2003 | Browne et al. | .................... | 703/2 |
| 2003/0101125 A1* | 5/2003 | McGill et al. | .................... | 705/37 |
| 2004/0078319 A1* | 4/2004 | Madhavan et al. | ............. | 705/38 |
| 2004/0267657 A1* | 12/2004 | Hecht | ............................ | 705/37 |
| 2006/0259394 A1* | 11/2006 | Cushing et al. | ................. | 705/37 |
| 2007/0061228 A1* | 3/2007 | Hecht | ............................ | 705/35 |
| 2007/0143198 A1* | 6/2007 | Brandes et al. | ............. | 705/36 R |
| 2007/0219893 A1* | 9/2007 | Xu | ............................... | 705/36 R |
| 2008/0015970 A1* | 1/2008 | Brookfield et al. | ............. | 705/37 |
| 2008/0120249 A1* | 5/2008 | Hiatt | .......................... | 705/36 R |
| 2008/0256001 A1* | 10/2008 | McGill | ........................ | 705/36 R |
| 2009/0012912 A1* | 1/2009 | Browne et al. | ............. | 705/36 R |
| 2009/0182684 A1* | 7/2009 | Shalen | ........................ | 705/36 R |
| 2009/0222372 A1* | 9/2009 | Hiatt, Jr. | ........................ | 705/37 |
| 2010/0036765 A1* | 2/2010 | Hecht | ............................ | 705/37 |
| 2010/0241585 A1* | 9/2010 | Hecht | .......................... | 705/36 R |
| 2010/0299238 A1* | 11/2010 | Hecht | ............................ | 705/37 |

OTHER PUBLICATIONS

Mark Pengelly; Adapt of Fail; FX Week, London; Mar. 9, 2009; vol. 20; Iss. 10; p. 14 (2 pgs).*
Anonymous; Market Watch: Trade Set-ups: Options for the Downturn; Businessline; Jul. 27, 2008.*
K. S. Badri Narayanan; Volatile Conditions May Prevail; Businessline; Chennai; Jan. 9, 2005; p. 1.*
Anonymous; Explaining Volatility Smile; Businessline; Chennai; Nov. 24, 2002; p. 1.*

* cited by examiner

*Primary Examiner* — Alexander Kalinowski
*Assistant Examiner* — Virpi H Kanervo
(74) *Attorney, Agent, or Firm* — K&L Gates LLP

(57) ABSTRACT

Systems and methods of generating metrics for volatility products are disclosed. According to various embodiments, the metric may use a carry of the volatility product and a volatility of the implied volatility to determine the metric. Through the metric, or carry quotient, global interest rate volatility may be searched to identify trades with attractive rolldown and carry characteristics.

20 Claims, 3 Drawing Sheets

SYSTEM AND METHOD FOR CALCULATING A VOLATILITY CARRY METRIC

BACKGROUND

"Realized volatility," sometimes referred to as "historical volatility," is a term usually used in the context of derivatives. While "implied volatility" typically refers to a market's assessment of future volatility, realized volatility measures what happened in the past. In some circumstances, as realized volatility picks up globally, short expiry volatility also may rally. Long dated volatility, however, may tend to lag in most markets. Accordingly, expiry curves may remain inverted in global volatility markets, with longer dated volatility well below levels reached during previous times when short dated volatility was so high. Investors who believe global interest rate volatility is likely to rally, or at a minimum, fail to decline in a significant way, can therefore establish positions in global volatility that carry very positively, where the gains from delta hedging high realized volatility outweigh the theta decay and the structures roll up the expiry curve.

SUMMARY OF THE INVENTION

In one general aspect, the present invention is directed to computer-based systems and methods of computing a metric for options have an underlier, such as volatility products. In various embodiments a computer system may calculate an implied volatility of the underlier. In various embodiments the computer system may calculate a volatility of the implied underlier. In various embodiments the computer system may calculate a second metric for the option that is based on a variance of the underlier. In various embodiments the computer system may calculate the first metric based on a ratio of the second metric to the volatility of the implied volatility of the underlier.

In another general aspect, the present invention is directed to computer-based systems and methods of computing, using a computer system, an implied volatility for the volatility product. In various embodiments, the computer system may calculate a volatility of the implied volatility of the volatility product. In various embodiments, the computer system may calculate a carry for the volatility product, where the carry is based on a variance of the volatility product. In various embodiments the computer system may calculate a carry quotient based on a ratio of the carry to the volatility of the implied volatility.

FIGURES

Various embodiments of the present invention are described herein by way of example in conjunction with the following figures wherein.

DETAILED DESCRIPTION OF THE INVENTION

Figure 1:
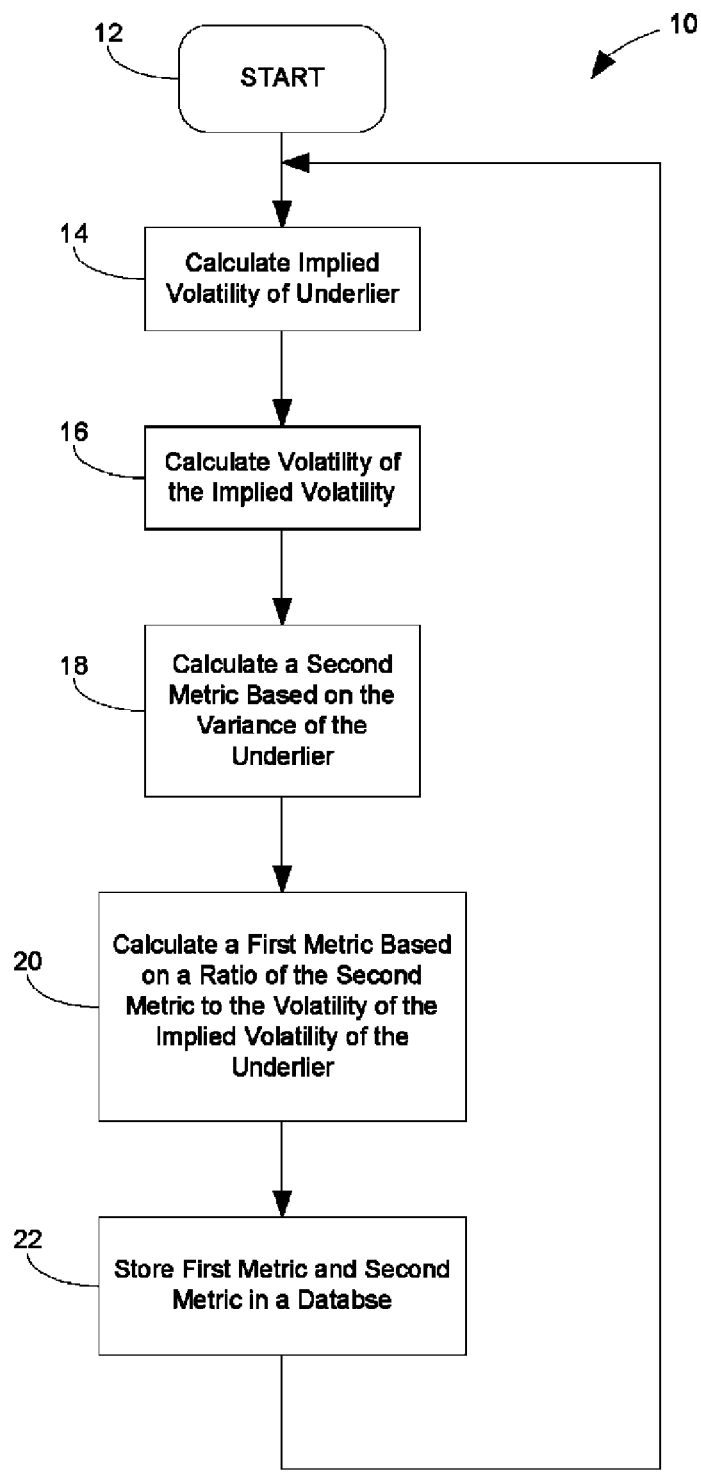
FIG. 1 is a flow chart of a process according to one embodiment of the present invention.

The carry for a bond is typically the difference between the fixed coupon on the bond and the floating financing costs of the repurchase agreement for the bond. The carry of a swap is typically the difference between the fixed rate on the swap and the floating rate of the swap. Generally, investors who want to analyze the potential profitability of a fixed income position must take into consideration both the current price and the carry. The steeper the shape of the yield curve generally, the larger the carry becomes, therefore becoming an increasingly important consideration.

Carry may be expressed in two ways that are mathematically equivalent. First, it may be expressed as the difference between fixed and floating. For swaps and bonds, this is the difference between the fixed coupon received and the financing costs (e.g., repurchase agreement for a bond or floating LIBOR for a standard swap) to the horizon of the trade. This form of carry is generally called "bps upfront." This form is typically used in analyzing notional neutral positions Second, carry may be expressed as the difference between forward and spot. For example, absence of arbitrage arguments, the carry on any asset to a given horizon is the difference between its spot price and its forward price at that horizon. This also can be expressed in "bps running," the difference between the forward rate and the spot rate.

In various embodiments, similar type metrics may be used in the volatility markets. The profit and lost statement (PNL) of a delta-hedged option may, in some embodiments, be described as the difference between the "realized" volatility of rates and the volatility implied by price. Accordingly, the PNL of the delta-hedged option may be represented by formula (1):

$$\text{Delta Hedging } PNL \approx \frac{1}{2}\sum \gamma(i)(\sigma_R^2(i) - \sigma_I^2(i)) \qquad (1)$$

Where:
$\gamma(i)$ is the gamma of the option at time i;
$\sigma_R^2 = (r_i - r_{i-1})^2$ is the realized variance; and
$\sigma_I^2(i)$ is the implied variance.

In some embodiments, a delta-hedged option may be viewed conceptually as a swap, where a fixed variance is paid and a floating variance is received. The cash flows of the delta-hedged option may be weighted by gamma, which may vary with time and rates. Thus, when trading volatility, whether through variance swaps or delta-hedged options, carry for volatility may be expressed similarly to carry for interest rate swaps.

In some embodiments, carry for rates and volatilities may be expressed in two manners. First, the carry may be expressed as the difference between floating and fixed. Following a swap analogy, the fixed side may be the volatility paid during each period. This value may be viewed as the theta decay, which typically may be a function of the fixed implied volatility over the life of the option. The floating side of a delta-hedged option may be the realized volatility/variance. To a fixed horizon, the expected value or price of the realized volatility may be derived from the implied volatility of a shorter expiry option, such as a midcurve, for example. In the volatility market, this difference may be considered the carry in "bp upfront," although it is appreciated that alternative nomenclature may be used.

Second, the carry may be expressed as the difference between spot and forward. Alternatively, in various embodiments, carry may be expressed as the difference between the forward volatility and spot volatility. This difference may be referred to as "normalized by running," for example. This value may refer to the forward expected vega (a measure of the sensitivity to volatility).

Gamma, which is a metric that measures the rate of change of delta, may, on average, be constant over the life of an initially at-the-money (ATM) option. Using an assumption of constant gamma, the calculation of carry may in some ways be similar as that of a variance swap, the difference between the fixed (implied) variance and floating (realized) variance on the horizon. Thus, in one embodiment, the analogy of a swap to calculate the carry as the expected value of the difference between floating and fixed may be used. Although, as may be understood by one skilled in the art, actual results will depend on the path of interest rates and realized volatility.

In various embodiments, forward prices, with the forward prices at a particular horizon assumed, may be used in the carry calculation. Forward prices may be available and gathered from various data sources or estimated. Generally, the variance until the expiry of a volatility trade can be represented as the average variance for different periods of the trade. If the variance of the underlying to the expiry of an option is known and the variance to the horizon data is known, the forward variance at the horizon date can be calculated. The forward variance is the level of applied volatility needed in order to breakeven on the carry.

For example, if the normalized volatility of a 5y10y swaption is $\sigma_5$, then the total variance for the five years should be $5\sigma_5^2$, which can be viewed as the "price" of the variance. If, however, the 2y forward volatility of the same underlying swap is $\sigma_{2,5}$, then the total variance obtained from years three to five is implied to be $3\sigma_{2,5}^2$. In order for the total variance over the five years to be $5\sigma_5^2$, the implied total variance for the first two years may be determined by equation (2):

$$2\sigma_2^2 = 5\sigma_5^2 - 3\sigma_{2,5}^2 \quad (2)$$

In one embodiment, the midcurve volatility is the annualized volatility ($\sigma_2$) for the first two years. Therefore, as may be appreciated, the midcurve is an option on a forward rate. In the example presented above, the option is a 2y option on the 3y10y forward swap rate.

In one embodiment, a general formula for volatility products may be expressed as equation (3), with the variance vega of the variance swaps denoted by $V_T$.

$$V_T \sigma_T^2 = V_t \sigma_t^2 + V_{t,T} \sigma_{t,T}^2 \quad (3)$$

While $V_T$ is the PV01 for a variance swap, by using variance vega $V_T$, a general formula for all volatility products may be obtained. Equation (3) may be re-written as equation (4):

$$T_{t,T}(\sigma_{t,T}^2 - \sigma_T^2) = V_t(\sigma_t^2 - \sigma_T^2) \quad (4)$$

Until the horizon (t), an investor long variance pays the fixed rate $\sigma_T^2$ and receives the floating, realized variance, whose expected value is $\sigma_t^2$, which gives the right hand side of equation (4). In this instance, carry is expressed in dollar terms.

The left side of equation (4) shows the difference between the spot and forward price. Taking out the PV01, the carry in normalized variance points running is produced.

For another look at carry, the "effective" variance ($\bar{\sigma}_T^2$) received at horizon (t) if the remaining variance is the same as the spot variance is sought. Equation (5) illustrates this approach to looking at carry:

$$V_{t,T}(\bar{\sigma}_T^2 - \sigma_T^2) = V_t(\sigma_t^2 - \sigma_T^2) \quad (5)$$

Thus, in various embodiments, there are three characterizations of carry. The first characterization describes how much realized volatility is priced in for the period until the horizon. Since in some embodiments the horizon is shorter than the life of the option, it may be beneficial to understand how much realized volatility is needed to be achieved in order to realize the carry. The second characterization describes how much the market price (e.g., the forward implied volatility) needs to move in order to lose the gains from carry, or to make it up in the case of negative carry. The third characterization allows an estimation of an "effective volatility" over the life of the option if the forwards are not met.

Historically, investors often have traded interest rate volatility through delta-hedged swaption straddles. As may be appreciated, the development of more sophisticated volatility products (e.g., volatility/variance swaps and forward volatility) has allowed investors to take pure views on volatility without the maintenance or rate exposure inherent in delta hedging. Most investors, however, still trade volatility through delta-hedged swaptions. Mathematically, the PNL of a delta-hedged option is roughly represented by equation (6):

$$\text{Delta Hedging } PNL \sim \frac{1}{2} \int e^{-rt} \gamma(t, r)(\sigma_R^2(t, r) - \sigma_I^2(t, r)) dt \quad (6)$$

Where:
$\sigma_R^2$ and $\sigma_I^2$ are the realized and implied volatilities, respectively; and
$\gamma$ is the gamma of the option.

To capture the difference between realized and implied volatility, a delta-hedged straddle must have a high gamma (i.e., must be close to the strike). Conversely, a variance swap allows perfect exposure to the squared changes in rates. That is, a variance swap would have the same PNL as delta hedged swaption if the gamma were constant.

In various embodiments, carry should be the difference between what is expected to be paid and what is expected to be received until horizon. The formula for the PNL of a delta-hedged swaption suggests that carry may be defined in accordance with equation (7):

$$\text{Carry} = E\left[\frac{1}{2} \sum_{i=1}^{t} e^{-rt} \gamma(i)(\sigma_R^2(i) - \sigma_I^2(i))\right] \quad (7)$$

Since gamma is non-constant for a swaption, the dollar value of carry on a swaption is not independent of the path of rates. If volatility is assumed independent of rates, then the formula simplifies to equation (8):

$$\text{Carry} = \frac{1}{2} \sum_{i=1}^{t} e^{-rt} E[\gamma(i)](\sigma_R^2(i) - \sigma_I^2(i)) \quad (8)$$

Assuming a normal model for interest rates, the expected value of gamma of an ATM option is constant over time and represented by equation (9):

$$V_{t_1, t_2} = E\left[\frac{1}{2} \int_{t_1}^{t_2} e^{-rt} \gamma(t, r) dt\right] = \lambda(t_2 - t_1) \quad (9)$$

Where:
$\lambda$ is a fixed constant.

In particular, the carry of the delta-hedged swaption may be represented by equation (10):

$$\text{Carry} = V_t(\sigma_t^2 - \sigma_T^2) \quad (10)$$

Using the same analysis, equation (3) can be rewritten to give rise to all three views of carry described above. With the expected gamma constant over the life of an option in various embodiments, equation (3) simplifies to equation (11) for an ATM swaption:

$$T\sigma_T^2 = t\sigma_t^2 + (T-t)\sigma_{t,T}^2 \tag{11}$$

In various embodiments, the "implied to realized premium" is the difference between historical realized volatility and the midcurve volatility priced in to the horizon. The adjusted carry, in various embodiments, is the carry plus this premium. In normal markets the implied to realized premium is typically a negative adjustment to carry for volatility longs. If trailing realized volatilities are used the implied to realized premium produces a positive adjustment to carry.

In various embodiments, the difference between realized volatility and the midcurve is analyzed. The first characterization of carry informs that the market is pricing, through the midcurve, a certain amount of realized volatility at the beginning of the life of the option. In order to achieve this carry, the realized volatility must exceed the midcurve, not simply the volatility of the option.

In various embodiments, rolldown for a swap is the expected capital gain on the swap if the rates rolldown the yield curve. For a horizon (t), the rollddown in bps running is equal to the difference in the longer maturity rate and the shorter maturity rate. The rolldown in bps upfront is the difference in rates multiplied by the PV01 of the swap at horizon, as shown in equation (12):

$$\text{Rolldown} = P_{T-t}(r_T - r_{T-t}) \tag{12}$$

In various embodiments, the same analogy applies for variance. For a horizon (t) the rolldown in normalized variance points running is equal to the difference in the longer expiry implied variance and the shorter expiry variance. The rolldown in bps upfront is the difference in rates multiplied by the vega of the swap at horizon, as shown in equation 13:

$$\text{Rolldown} = V_{T-t}(\sigma_T^2 - \sigma_{T-t}^2) \tag{13}$$

As may be appreciated, for pure volatility products like variance swaps (and with some modification volatility swaps and forward volatility agreements) this analogy is perfect as these trades have constant volatility exposure.

Since rate volatility may be best understood in normalized absolute basis points, the rate carry in bps running, is divided by the realized, normalized volatility. Accordingly, the higher the volatility, the higher the volatility to volatility.

In various embodiments, the absolute level of carry should be viewed relative to the level of volatility, with a high value for carry being more attractive if volatility is low than if volatility is high. Thus, as may be appreciated, it is useful to measure the percent carry as the percent of the level of volatility/variance. Using the notation from the third characterization of carry, the percent carry for a variance swap may be expressed as equation (14):

$$\text{Var Swap Carry} = \ln\left(\frac{\sigma_T^2}{\sigma_T^2}\right) \tag{14}$$

For a volatility swap or a straddle, the percent carry may be expressed as equation (15):

$$\text{Straddle Carry} = \ln\left(\frac{\sigma_T}{\sigma_T}\right) \tag{15}$$

Equation (14) and equation (15) are related by equation (16):

$$\text{Var Swap Carry} = \ln\left(\frac{\sigma_T^2}{\sigma_T^2}\right) = 2\ln\left(\frac{\sigma_T}{\sigma_T}\right) = 2 \cdot \text{Straddle Carry} \tag{16}$$

When looking at carry trades on swaps, a carry quotient can be used to seek out relative value across the curve. The carry quotient is carry divided by the realized volatility of the rate. In various embodiments, the volatility is annualized to the horizon of the carry. For example, the daily volatility may be multiplied by the square root of a time period, such as $\sqrt{252}$, where 252 is the number of trading days in a year.

For volatility trades, the same metric may be used, dividing the percent carry by the "lognormal" realized volatility, that is, the volatility of the daily percent returns. Therefore, just as the percent carry is doubled for variance swaps, so is its volatility. In particular, by dividing the volatility of implied volatility, the carry quotient is the same for all volatility products. Accordingly, an investor can use the calculated carry quotient to compare trades across relative asset classes.

An inversion of expiry curves globally implies that forward volatilities are cheaper than spot, and therefore, imply volatility may decline from current levels. In such situations, for investors that expect volatility to stay high, entering trades with significant rolldown and carry offers an opportunity to profit if volatility does not meet forwards. The risk investors are taking when entering a long volatility trade is that the capital losses from any fall in implied volatility will be larger than the rolldown and carry from the position. That is, in searching for attractive trades, in various embodiments two metrics may be analyzed; one measuring the carry and a second measuring the level of volatility relative to history.

With regard to the first metric, any capital losses on a volatility position will be dependent on changes in the implied volatility of the option. As such, in order to identify attractive trades, trades need to be identified that have a high level of rolldown and carry as compared to the volatility of implied volatility of the option ("vol of vol"). For this metric, the carry quotient may be a ratio of rolldown and/or carry to the volatility of volatility.

With regard to the second metric, entering a long volatility position with positive rolldown and carry is a bet that the volatility will not fall as much as the forward volatilities imply. In various embodiments, it is preferred to make the bet where levels of the implied volatility are low compared to historical levels.

In various embodiments, using the carry quotient, carry, and rolldown, for example, market data may be analyzed to find attractive volatility trades. Specifically, volatility trades that offer attractive potential risk-adjusted returns in both short-expiry and long-expiry volatility markets may be identified.

FIG. 1 is a flow chart illustrating a process 10 for computing the first and second metrics in accordance with various embodiments of the present invention. The process may be implemented using a computer system, as described further below. First, for an option having an underlier, the implied volatility of the underlier is calculated at 14. The implied volatility may be calculated using the Black-Scholes formula, for example. As may be understood by those skilled in the art, the calculation may be performed by an electronic processor of the computer system. Next, the volatility of the implied volatility is calculated at 16. A second metric may be calculated based on the variance of the underlier at 18. For example, the second metric may be carry as shown in equation 10. Next, a first metric, such as a carry quotient, based on a ratio of the second metric to the volatility of the implied volatility of the underlier is calculated at 20. Finally, the first metric and second metric may be stored in a database, or other suitable electronic storage medium, at 22. The process may be repeated for additional options.

Figure 2:
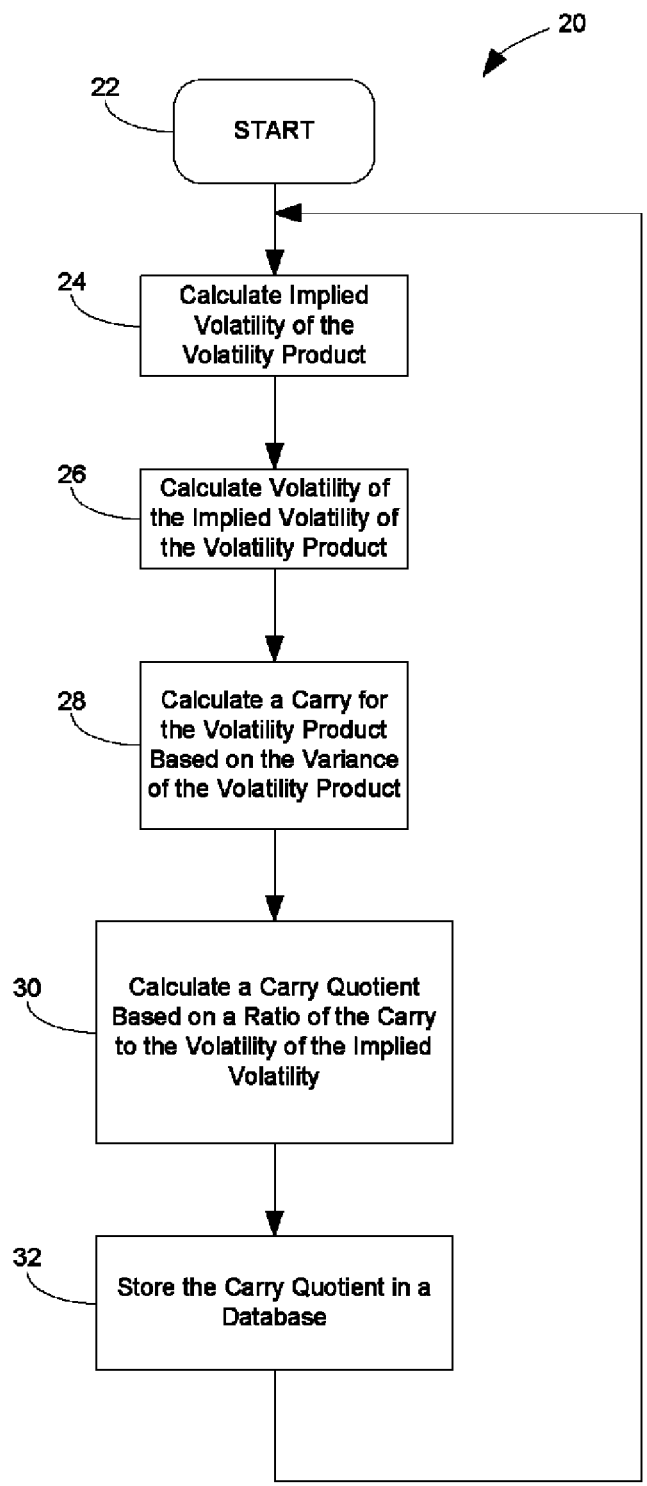
FIG. 2 is a flow chart of a process according to one embodiment of the present invention.

FIG. 2 is a flow chart illustrating a process 20 for computing the first and second metrics in accordance with various embodiments of the present invention. The process may be implemented using a computer system, as described further below. First, for a volatility product, the implied volatility of the volatility product is calculated at 24. As may be understood by those skilled in the art, the calculation may be performed by an electronic processor. Next, the volatility of the implied volatility is calculated at 26. Carry may be calculated based on the variance of the volatility product at 28. Next, a carry quotient based on a ratio of the carry to the volatility of the implied volatility of the volatility product is calculated at 30. Finally, the carry may be stored in a database, or other suitable electronic storage medium, at 32. The process may be repeated for additional volatility products. In various embodiments, the volatility products may include swaption straddles, variance swaps, and swaption.

Figure 3:
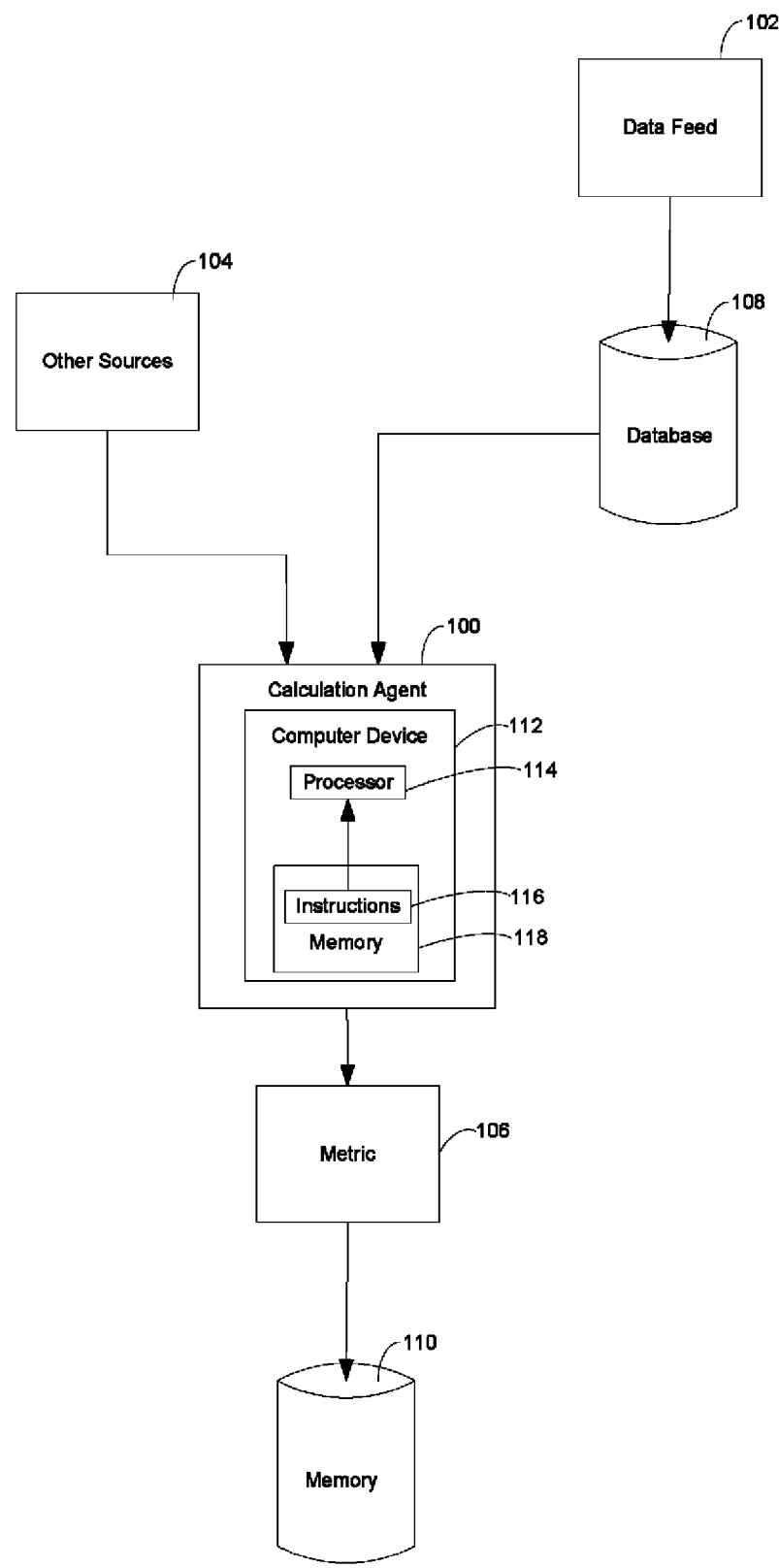
FIG. 3 is a block diagram of a computer system according to various embodiments of the present invention.

As illustrated in FIG. 3, a metric 106, such as the first metric and/or the second metric, may be calculated by a computer-based calculation agent 100 using relevant data sources, such as an electric computer database 108 that stores information and market data from a data feed 102. The data feed 102 may transmit data via an electronic data component network, such as a LAN or WAN, for storage in the database 108. In some embodiments, the data feed 102 may supply the calculation agent 100 directly with relevant data, such as information regarding various markets, such as swaption and volatility markets. In various embodiments, the calculation agent 100 may receive information from other sources 104. The calculation agent 100 may receive the information through any suitable techniques, such as through a computer network connection or from a data storage device, for example. The calculation agent 100 may utilize a computer device 112, such as a personal computer, laptop, server, mainframe, for example, to calculate the metrics. The computer device 112 may comprise one or more processors 114 and a memory 118. The processors may comprise a processor integrated circuit, for example, having one or multiple cores. The memory 118 may comprise various forms of memory circuits, such as volatile and non-volatile memory, for example. The volatile memory may comprise RAM, such as a RAM IC. The non-volatile memory may comprise ROM (such as a ROM IC), PROM (such as an EEPROM IC), a magnetic hard disk drive, and/or an optical disk drive, for example. Software with instructions 116 for calculating the metrics may be stored on a memory associated with the computer device. The processor 114 of the computer device may execute the software to calculate the metrics. The computer device 112 may have one or multiple processors and/or that the processors may have one or multiple cores. The calculated metrics may be stored in a memory or computer file associated with the computer device. In addition, the calculated metric may be transmitted in a file via a computer to a remove computer device or system. The value of the metric may be stored in any suitable memory structure, such as a computer memory 110.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for calculating a first metric for an option having an underlier, the method comprising:
   calculating, by a computer system, an implied volatility of the underlier;
   calculating, by the computer system, a volatility of the implied volatility of the underlier;
   calculating, by the computer system, a second metric for the option, wherein the second metric is based on a variance of the underlier; and
   calculating, by the computer system, the first metric based on a ratio of the second metric to the volatility of the implied volatility of the underlier,
   wherein the computer system comprises a processor circuit and a memory circuit.

2. The method of claim 1, wherein the second metric is based on ft the variance of the underlier and a rolldown for the underlier.

3. The method of claim 1, wherein the second metric is based on a volatility of daily percent returns.

4. The method of claim 1, wherein the second metric is a carry of the option and the first metric is a carry quotient of the option.

5. The method of claim 1, wherein the second metric is combined with a premium to produce an adjusted second metric.

6. The method of claim 5, wherein the premium is a difference between a historical realized volatility and a midcurve volatility priced in to a horizon.

7. The method of claim 1, wherein the second metric is a carry of the option and the first metric is a carry quotient of the option, wherein the second metric is combined with a premium to produce an adjusted second metric, and wherein the premium is a difference between a historical realized volatility and a midcurve volatility priced in to a horizon.

8. A system for computing a first metric for an option having an underlier, the system comprising:
   a computer database; and
   a computer device in communication with the database, wherein the computer device comprises at least one processor circuit and at least one memory circuit, wherein the computer device is programmed to calculate the first metric by:
   calculating an implied volatility of the underlier;
   calculating a volatility of the implied volatility of the underlier;
   calculating a second metric for the option, wherein the second metric is based on a variance of the underlier; and
   calculating the first metric based on a ratio of the second metric to the volatility of the implied volatility of the underlier.

9. The system of claim 8, wherein the second metric is based on the variance of the underlier and a rolldown for the underlier.

10. The system of claim 8, wherein the second metric is based on a volatility of daily percent returns.

11. The system of claim 8, wherein the second metric is a carry of the option and the first metric is a carry quotient of the option.

12. The system of claim 8, wherein the second metric is combined with a premium to produce an adjusted second metric.

13. The system of claim 12, wherein the premium is a difference between a historical realized volatility and a midcurve volatility priced in to a horizon.

14. The system of claim 8, wherein the second metric is a carry of the option and the first metric is a carry quotient of the option, wherein the second metric is combined with a premium to produce an adjusted second metric, and wherein the premium is a difference between a historical realized volatility and a midcurve volatility priced in to a horizon.

15. A computer-implemented method for calculating a first metric for a volatility product, the method comprising:
   calculating, using a computer system, an implied volatility for the volatility product;
   calculating, using the computer system, a volatility of the implied volatility of the volatility product;
   calculating, using the computer system, a carry for the volatility product, wherein the carry is based on a variance of the volatility product; and
   calculating, using the computer system, a carry quotient based on a ratio of the carry to the volatility of the implied volatility of the volatility product,
   wherein the computer system comprises a processor circuit and a memory circuit.

16. The method of claim 15, wherein the volatility product is a swaption straddle.

17. The method of claim 15, wherein the volatility product is a variance swap.

18. The method of claim 15, wherein the volatility product is a swaption.

19. The method of claim 15, wherein the carry is adjusted using an implied-to-realized premium, wherein the implied-to-realized premium is a difference between a historical realized volatility and a midcurve volatility priced in to a horizon of the volatility product.

20. A non-transitory computer readable medium having instructions stored thereon which when executed by a processor cause the processor to:
   calculate an implied volatility for a volatility product;
   calculate a volatility of the implied volatility of the volatility product;
   calculate a carry for the volatility product, wherein the carry is based on a variance of the volatility product; and
   calculate a carry quotient based on a ratio of the carry to the volatility of the implied volatility of the volatility product.

* * * * *